(12) United States Patent
Shitabo

(10) Patent No.: US 9,479,092 B2
(45) Date of Patent: Oct. 25, 2016

(54) MOTOR DRIVE DEVICE

(71) Applicant: Nidec Techno Motor Corporation, Kyoto (JP)

(72) Inventor: Hiroyuki Shitabo, Kyoto (JP)

(73) Assignee: NIDEC TECHNO MOTOR CORPORATION, Kyoto (JP)

(*) Notice: Subject to any disclaimer, the term of this patent is extended or adjusted under 35 U.S.C. 154(b) by 39 days.

(21) Appl. No.: 14/538,267

(22) Filed: Nov. 11, 2014

(65) Prior Publication Data

US 2015/0145446 A1    May 28, 2015

(30) Foreign Application Priority Data

Nov. 22, 2013 (JP) ................................ 2013-241670

(51) Int. Cl.

| H02M 7/00 | (2006.01) |
|---|---|
| H02P 27/02 | (2016.01) |
| H02P 6/00 | (2016.01) |
| H02P 27/06 | (2006.01) |
| H02P 7/29 | (2016.01) |
| H02M 1/42 | (2007.01) |
| H02P 31/00 | (2006.01) |

(52) U.S. Cl.
CPC . *H02P 6/00* (2013.01); *H02P 7/29* (2013.01); *H02P 27/06* (2013.01); *H02M 2001/4291* (2013.01); *H02P 31/00* (2013.01); *Y02B 70/126* (2013.01)

(58) Field of Classification Search
CPC ........ H02P 6/002; H02P 27/08; H02P 27/06; H02P 2201/03; H02P 6/08; H02P 21/0003; H02P 2201/13; H02P 25/021; H02P 25/22; H02P 27/00; H02P 29/02

USPC ......................................... 318/478, 479, 504
See application file for complete search history.

(56) References Cited

U.S. PATENT DOCUMENTS

| 3,913,002 A * | 10/1975 | Steigerwald ............ H02M 1/15 315/208 |
|---|---|---|
| 4,042,856 A * | 8/1977 | Steigerwald ........ H02M 1/4208 315/205 |
| 4,300,086 A * | 11/1981 | Cesarz .................... H02P 27/08 318/801 |
| 4,683,415 A * | 7/1987 | Zimmerman ......... H02M 3/155 307/41 |

FOREIGN PATENT DOCUMENTS

JP    H07123721 A    5/1995

* cited by examiner

*Primary Examiner* — Bentsu Ro
(74) *Attorney, Agent, or Firm* — Cantor Colburn LLP

(57) ABSTRACT

A motor drive device includes a constant voltage power supply and a motor drive control unit. The constant voltage power supply includes an AC/DC converter, a zero-cross detector, a switching control unit and a switching regulator. The AC/DC converter converts an AC voltage supplied from an AC voltage source into a DC voltage. The zero-cross detector detects a zero-cross point of the AC voltage, and outputs a zero-cross detection signal. The switching control unit outputs a switching control signal based on the zero-cross detection signal. The switching regulator has a switching element. The motor drive control unit outputs a motor drive signal for driving a motor to the inverter. The AC/DC converter has a rectifier circuit and a smoothing capacitor. The switching regulator performs switching on a first DC voltage in accordance with the switching control signal at a timing corresponding to the zero-cross point.

20 Claims, 7 Drawing Sheets

MOTOR DRIVE DEVICE

CROSS REFERENCE TO RELATED APPLICATIONS

The present invention claims priority under 35 U.S.C. §119 to Japanese Application No. 2013-241670 filed Nov. 22, 2013, the entire content of which is incorporated herein by reference.

BACKGROUND OF THE INVENTION

1. Field of the Invention

The present invention relates to a motor drive device.

2. Description of the Related Art

Conventionally, there is known a motor drive device having a constant voltage power supply. In order to drive a brushless DC motor using an AC voltage source, the constant voltage power supply converts an AC voltage supplied from the AC voltage source into a DC voltage. Further, conventionally, there is known a constant voltage power supply having a smoothing capacitor and a rectifier circuit for rectifying an AC voltage.

A conventional constant voltage power supply is disclosed in, e.g., Japanese Patent Application Publication No. 1995-123721. As disclosed in Japanese Patent Application Publication No. 1995-123721, in a constant voltage power supply formed by simply combining a smoothing capacitor with a rectification bridge circuit for rectifying an AC voltage, there occurs a problem that a power factor is reduced (see Paragraphs [0002] and [0005] and FIGS. 4 and 5). Therefore, in the constant voltage power supply disclosed in Japanese Patent Application Publication No. 1995-123721, the power factor is improved by using a transformer (see Paragraph [0020]).

However, in the case where the constant voltage power supply has a transformer, the constant voltage power supply is increased in size. Further, the transformer causes a power loss such as heat generation to thereby reduce the efficiency. Therefore, the transformer is not suitable for the constant voltage power supply used in the motor drive device.

In view of the above, at least an embodiment of the present invention provides a motor drive device having a constant voltage power supply capable of suppressing a decrease in efficiency while improving a power factor.

SUMMARY OF THE INVENTION

In accordance with an exemplary embodiment of the present invention, a motor drive device includes a constant voltage power supply and a motor drive control unit. The constant voltage power supply supplies a DC voltage to an inverter for driving a motor, and includes an AC/DC converter, a zero-cross detector, a switching control unit and a switching regulator. The AC/DC converter converts an AC voltage supplied from an AC voltage source into a DC voltage and outputs a first DC voltage. The zero-cross detector detects a zero-cross point of the AC voltage, and outputs a zero-cross detection signal. The switching control unit outputs a switching control signal that is a PWM signal at a timing based on the zero-cross detection signal. The switching regulator receives the first DC voltage, and outputs, to the inverter, a second DC voltage generated by performing switching on the first DC voltage. The motor drive control unit outputs a motor drive signal to the inverter based on an inputted rotation command signal. The AC/DC converter has a rectifier circuit for rectifying the AC voltage, and a smoothing capacitor. The switching regulator has a switching element for performing the switching in accordance with the switching control signal.

In accordance with the exemplary embodiment of the present invention, a current flowing through a switching regulator can be adjusted at a timing corresponding to a zero-cross point of an AC voltage. Thus, it is possible to improve a power factor. Further, since a transformer for improving a power factor is not used, efficiency can be improved as compared with a power supply having a power factor improvement circuit using a transformer. Thus, by using the constant voltage power supply of the motor drive device of at least an embodiment of the present invention, it is possible to suppress a decrease in efficiency while improving a power factor.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, an exemplary embodiment of the present invention will be described in detail with reference to the accompanying drawings.

1. Embodiment

Figure 1:
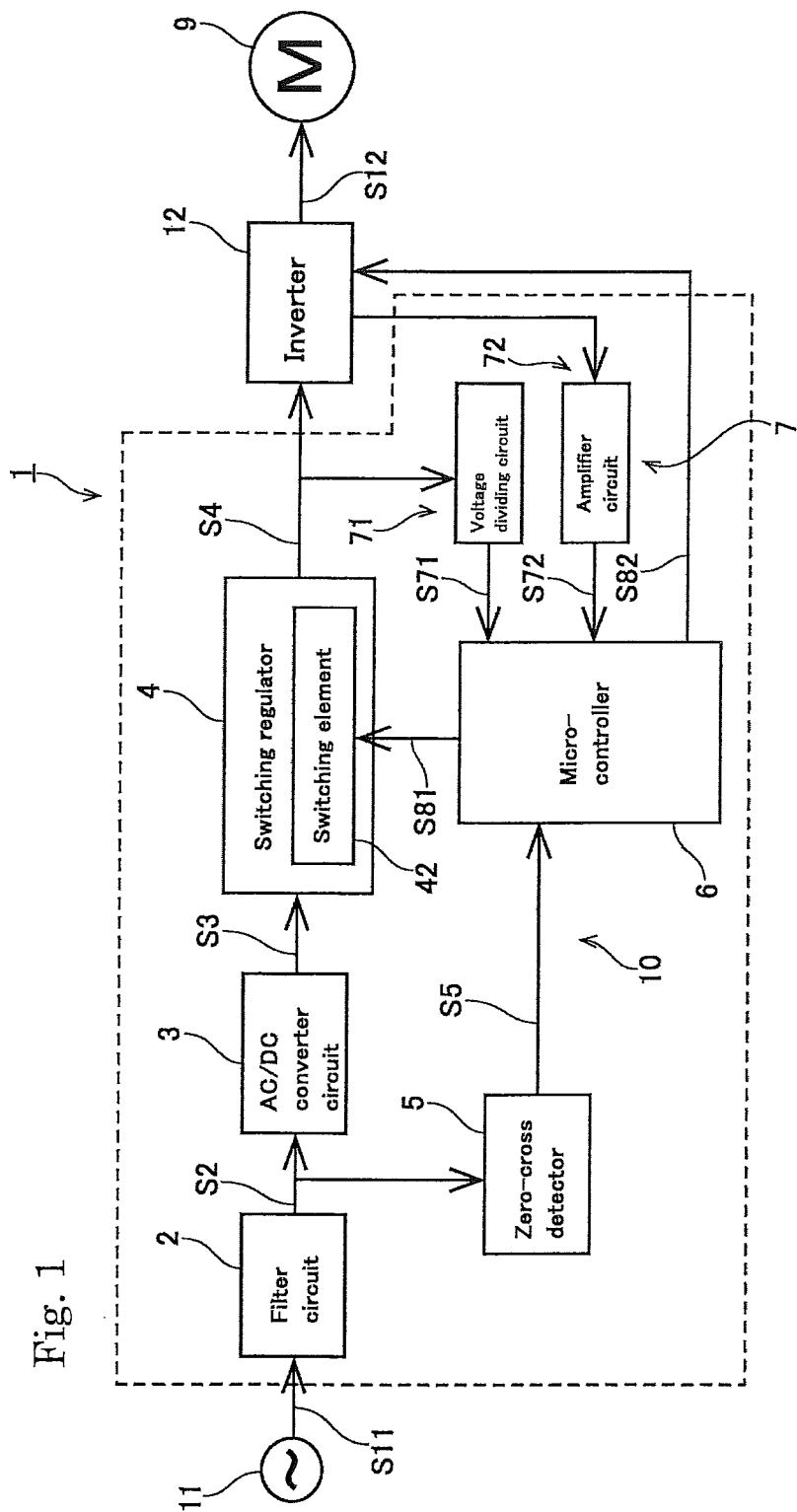
FIG. 1 is a block diagram showing a configuration of a motor drive device in accordance with an embodiment.
Figure 2:
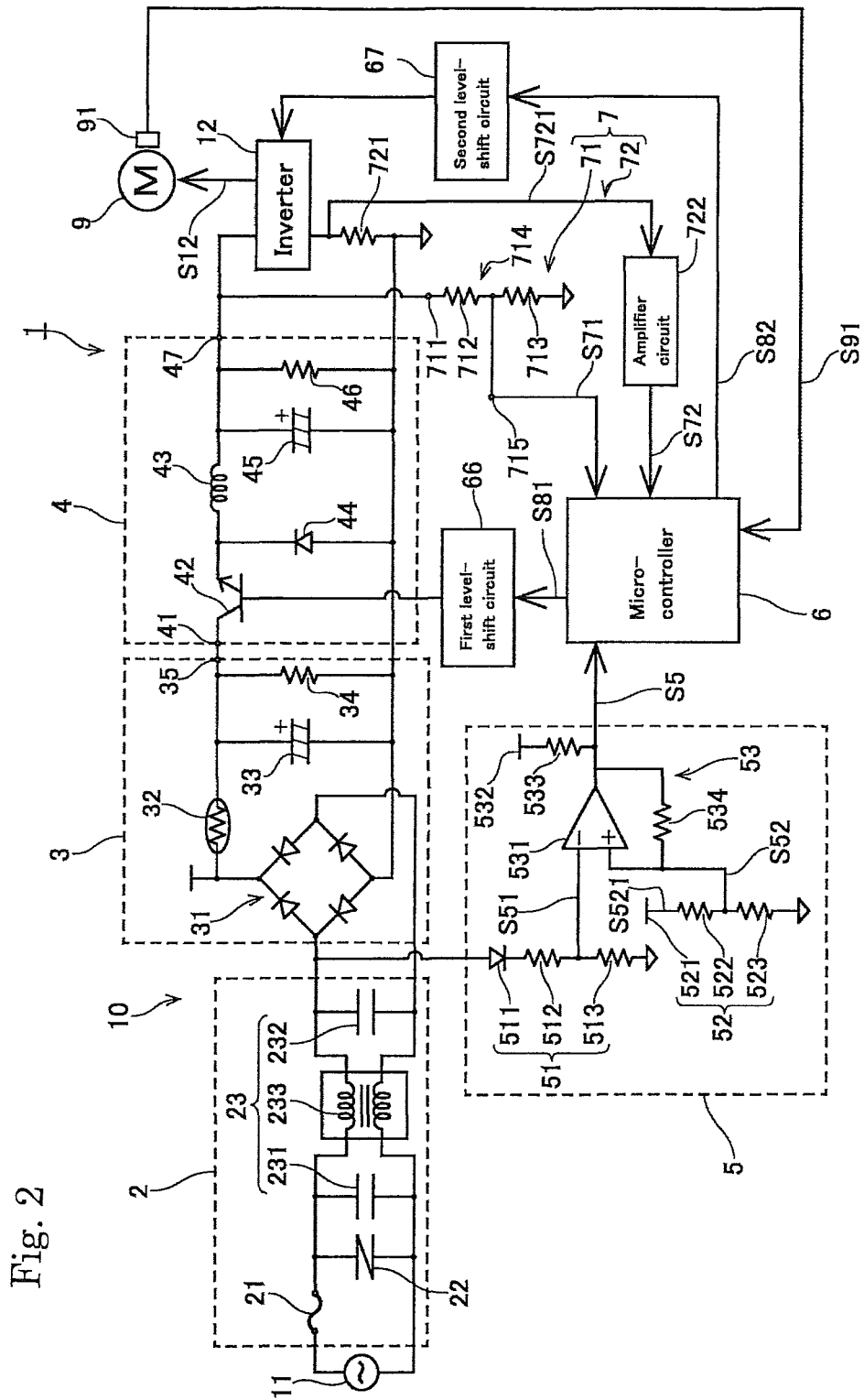
FIG. 2 is a circuit diagram showing a configuration of the motor drive device according to the embodiment.
Figure 3:
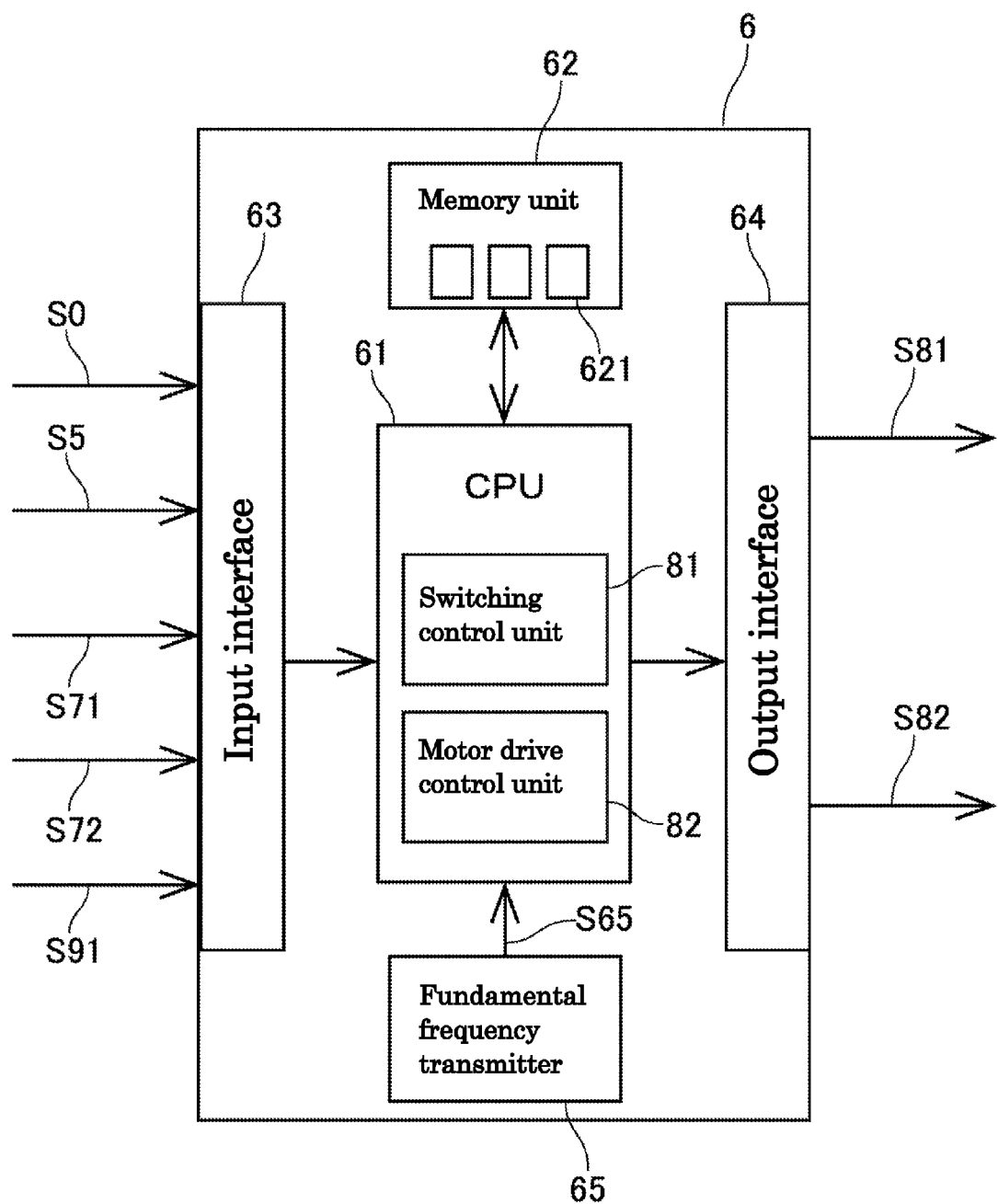
FIG. 3 is a block diagram showing a configuration of a microcontroller in accordance with the embodiment.
Figure 4:
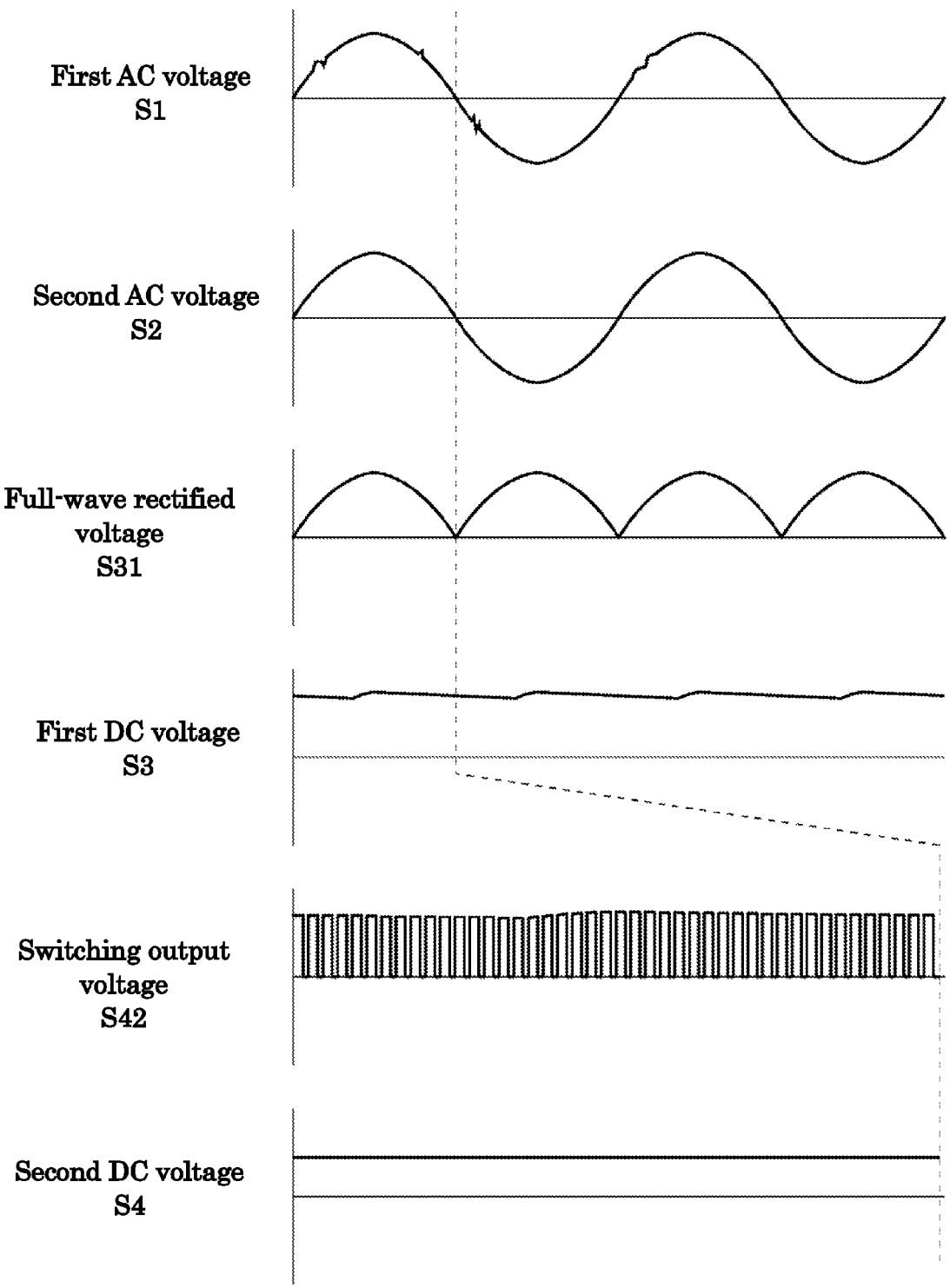
FIG. 4 is a view showing a voltage waveform of each part of the motor drive device in accordance with the embodiment.
Figure 5:
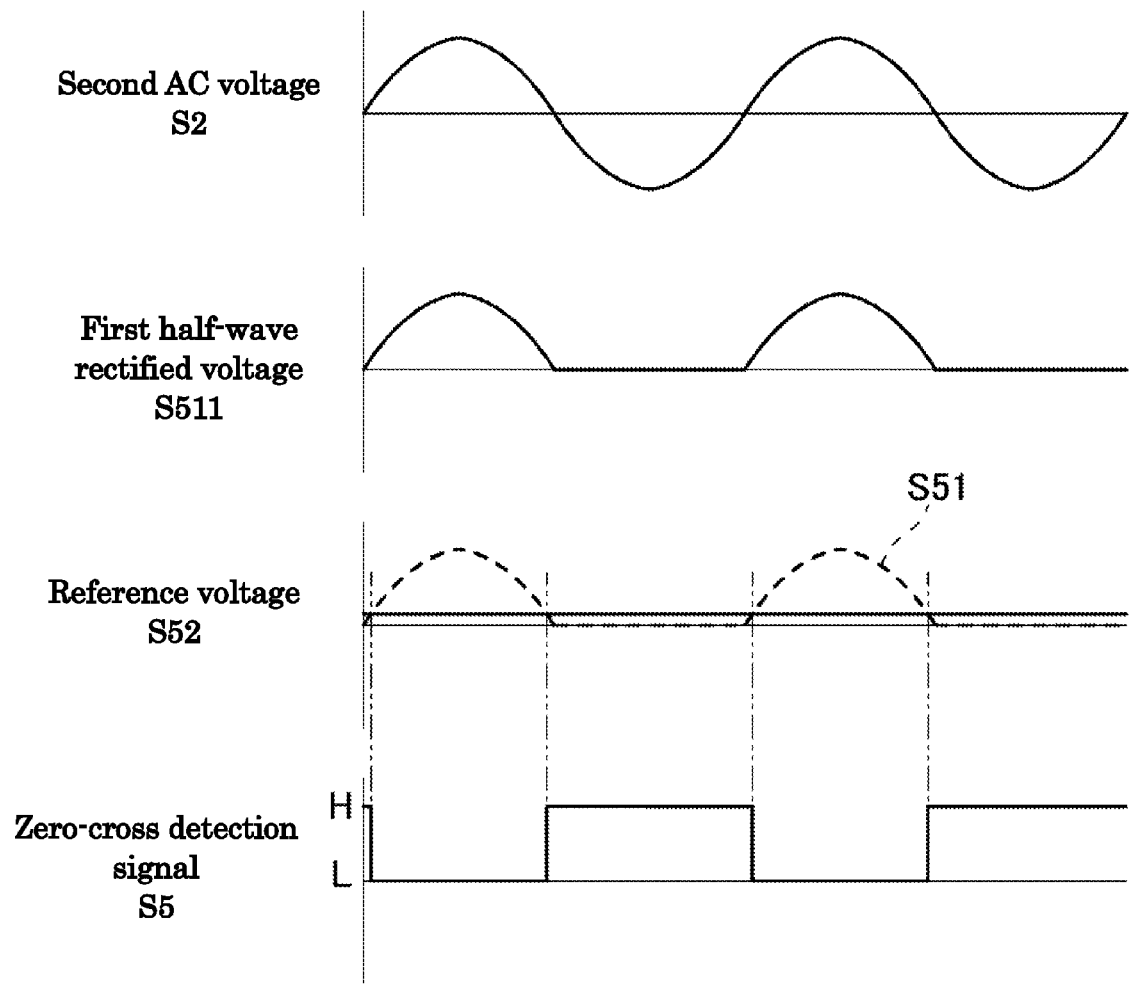
FIG. 5 is a view showing a voltage waveform of each part of the motor drive device in accordance with the embodiment.
Figure 6:
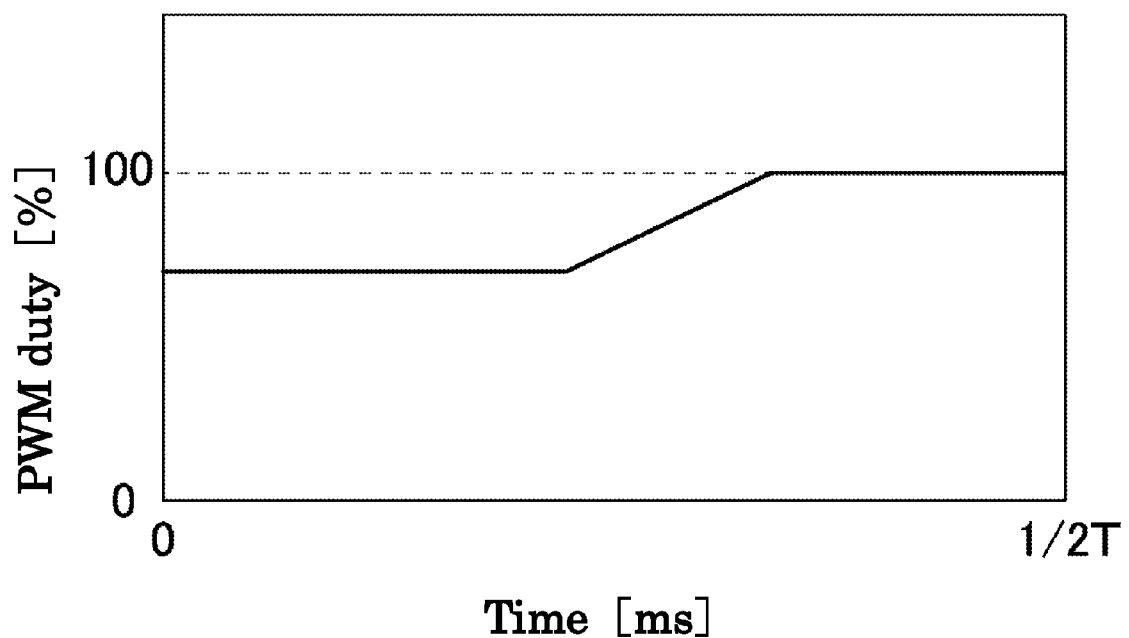
FIG. 6 is a view showing an example of a PWM (pulse width modulation) profile of the motor drive device in accordance with the embodiment.

First, an overall configuration of a motor drive device 1 will be described. FIG. 1 is a block diagram conceptually showing a configuration of the motor drive device 1 in accordance with an embodiment. FIG. 2 is a circuit diagram showing a configuration of the motor drive device 1. FIG. 3 is a block diagram conceptually showing a configuration of a microcontroller 6. FIGS. 4 and 5 are views showing the voltage waveform of each part of the motor drive device 1. FIG. 6 is a view showing an example of a PWM (pulse width modulation) profile of the motor drive device 1.

The motor drive device 1 supplies a DC voltage to an inverter 12 and controls the driving of a motor 9. As shown in FIG. 1, the motor drive device 1 preferably includes a filter circuit 2, an AC/DC converter circuit 3, a switching regulator 4, a zero-cross detector 5, a microcontroller 6 and a feedback unit 7.

In the present embodiment, the motor 9 to be driven by the motor drive device 1 is a three-phase brushless DC motor. The motor 9 has a stator coil of each phase of U, V and W phases. When a drive current is supplied to the stator coil of each phase, a torque is generated between the stator and a rotor, and the rotor is rotated. However, the motor to be driven by the motor drive device according to at least an embodiment of the present invention may be a single-phase motor or brush motor.

Further, the motor 9 has a position detector 91 as shown in FIG. 2. The position detector 91 detects the position of the rotor of the motor 9, and delivers a detection result as a position information detection signal S91 to a motor drive control unit 82 to be later described. For example, the position detector 91 detects the position of the rotor by combining signals outputted from three magnetic sensors arranged at intervals of 120 electrical degrees.

As shown in FIG. 2, the filter circuit 2 preferably includes a fuse 21, a varistor 22 and a line filter 23. The fuse 21 protects a subsequent electric circuit from overcurrent. The varistor 22 protects each of electronic components incorporated in a subsequent electric circuit from overvoltage. The line filter 23 is a so-called AC power line filter to remove a noise contained in a first AC voltage S11. The line filter 23 has two capacitors 231 and 232, and a common mode choke 233.

Thus, as shown in FIG. 4, the filter circuit 2 removes the noise included in the first AC voltage S11 supplied from an AC voltage source 11, and outputs a second AC voltage S2.

As shown in FIG. 1, the AC/DC converter circuit 3 converts the second AC voltage S2 into a first DC voltage S3 and outputs the first DC voltage S3. As shown in FIG. 2, the AC/DC converter circuit 3 preferably includes a diode bridge 31, a thermistor 32, a first smoothing capacitor 33 and a resistor 34.

The diode bridge 31 is a full-wave rectifier circuit having four diodes. The second AC voltage S2 is inputted to the diode bridge 31. One of two output terminals of the diode bridge 31 is connected to one end of the thermistor 32 and the other one thereof is grounded. As shown in FIG. 4, when the second AC voltage S2 is inputted to the diode bridge 31, a full-wave rectified voltage S31 having only a positive voltage waveform is outputted between the two output terminals of the diode bridge 31.

The thermistor 32 is an inrush power suppression element. The one end of the thermistor 32 is connected to one of the output terminals of the diode bridge 31, and the other end of the thermistor 32 is connected to an output terminal 35 of the AC/DC converter circuit 3.

The first smoothing capacitor 33 smoothes the full-wave rectified voltage S31 outputted from the diode bridge 31, and converts it into a DC voltage. One end of the first smoothing capacitor 33 is connected to the other end of the thermistor 32, and the other end of the first smoothing capacitor 33 is grounded. The resistor 34 is connected in parallel with the first smoothing capacitor 33. Thus, as shown in FIG. 4, the first DC voltage S3 that has become almost a constant voltage by the smoothing of the full-wave rectified voltage S31 is outputted from the AC/DC converter circuit 3.

The switching regulator 4 performs switching on the inputted first DC voltage S3 to generate a second DC voltage S4. As shown in FIG. 2, the switching regulator 4 preferably includes an input terminal 41, a switching element 42, an inductor 43, a diode 44, a second smoothing capacitor 45, a resistor 46, and an output terminal 47.

The input terminal 41 is connected to the output terminal 35 of the AC/DC converter circuit 3. One side of the switching element 42 is connected to the input terminal 41. The other side of the switching element 42 is connected to the inductor 43. ON/OFF of the switching element 42 is controlled by a switching control signal S81 to be later described, which is inputted to the switching element 42 from the microcontroller 6. When the switching element 42 is turned on, a current flows from the one side to the other side of the switching element 42. When the switching element 42 is turned off, electrical connection between the one side and the other side of the switching element 42 is cut off. Thus, as shown in FIG. 4, a switching output voltage S42 having a pulse waveform is outputted to the other side of the switching element 42.

The switching element 42 is turned on and off by a switching control unit 81 (to be later described) of the microcontroller 6, thereby controlling a timing at which a current flows from the input terminal 41 to the output terminal 47. Accordingly, it is possible to improve a power factor of the power supplied from the AC voltage source 11.

The inductor 43 is connected between the output terminal 47 and the other side of the switching element 42. The diode 44 is connected between the ground and a junction between the switching element 42 and the inductor 43. Further, the second smoothing capacitor 45 and the resistor 46 are connected between the ground and the output terminal 47. Thus, as shown in FIG. 4, the switching output voltage S42 is smoothed, and the second DC voltage S4 is outputted from the output terminal 47 to the inverter 12.

The switching regulator 4 of the present embodiment is a switching regulator of a so-called step-down chopper type. Therefore, as shown in FIG. 4, an average voltage value of the second DC voltage S4 outputted from the switching regulator 4 is smaller than an average voltage value of the first DC voltage S3 inputted to the switching regulator 4.

The zero-cross detector 5 detects a zero-cross point at which a voltage value of the second AC voltage S2 becomes zero, and outputs a zero-cross detection signal S5. The zero-cross detector 5 includes a half-wave rectifier circuit 51, a reference voltage supply unit 52 and a comparator 53.

The half-wave rectifier circuit 51 includes a diode 511 and two resistors 512 and 513. The diode 511 half-wave rectifies the second AC voltage S2. As shown in FIG. 5, when the second AC voltage S2 is inputted to the anode of the diode 511, a part of the second AC voltage S2, which has a voltage value of less than 0, is cut out. Accordingly, a first half-wave rectified voltage S511 having only a voltage value of 0 or more is outputted to the cathode of the diode 511.

One end of the resistor 512 is connected to the cathode of the diode 511, and the other end of the resistor 512 is connected to the resistor 513. One end of the resistor 513 is connected to the resistor 512, and the other end of the resistor 513 is grounded. Further, a connection point between the resistor 512 and the resistor 513 is connected to an operational amplifier 531 (to be later described) of the comparator 53. Thus, the first half-wave rectified voltage S511 outputted from the diode 511 is divided according to a resistance ratio of the resistors 512 and 513, and then inputted to the comparator 53 as a second half-wave rectified voltage S51.

The reference voltage supply unit 52 includes a first constant voltage source 521 and two resistors 522 and 523. A first constant voltage S521 is inputted to one end of the resistor 522 from the first constant voltage source 521, and the other end of the resistor 522 is connected to the resistor 523. One end of the resistor 523 is connected to the resistor 522, and the other end of the resistor 523 is grounded. In addition, a connection point between the resistor 522 and the resistor 523 is connected to the operational amplifier 531 (to be later described) of the comparator 53. Thus, the first constant voltage S521 is supplied from the first constant voltage source 521. The first constant voltage S521 is divided according to a resistance ratio of the resistors 522 and 523, and then inputted to the comparator 53 as a reference voltage S52. In the present embodiment, each of the first constant voltage S521 and the reference voltage S52 is a positive DC voltage. However, the voltage value of the reference voltage S52 is sufficiently small compared to the maximum value of the second half-wave rectified voltage S51.

The comparator 53 compares the voltage value of the second half-wave rectified voltage S51, which is a comparison target, with the voltage value of the reference voltage S52 to output the zero-cross detection signal S5. The comparator 53 includes the operational amplifier 531, a second constant voltage source 532, and two resistors 533 and 534.

In the present embodiment, the second half-wave rectified voltage S51 is inputted to an inverting input terminal of the operational amplifier 531, and the reference voltage S52 is inputted to a non-inverting input terminal of the operational amplifier 531. The second constant voltage source 532 is connected to an output terminal of the operational amplifier 531 via the resistor 533. Further, the non-inverting input terminal and the output terminal of the operational amplifier 531 are connected to each other via the resistor 534.

Thus, as shown in FIG. 5, when the voltage value of the second half-wave rectified voltage S51 is larger than the voltage value of the reference voltage S52, the zero-cross detection signal S5 has a voltage value L. Further, when the voltage value of the second half-wave rectified voltage S51 is smaller than the voltage value of the reference voltage S52, the zero-cross detection signal S5 has a voltage value H. In this way, the zero-cross detection signal S5 has a waveform in which the voltage value L and the voltage value H are switched alternately at a boundary near the zero-cross point of the second AC voltage S2. Herein, each of the voltage value L and the voltage value H is equal to or larger than 0, and the voltage value H is larger than the voltage value L. Further, FIG. 5 illustrates the second half-wave rectified voltage S51 (represented by dashed lines) superimposed on the reference voltage S52.

The microcontroller 6 is an integrated circuit for controlling the operation of the switching element 42 and the operation of the inverter 12. As shown in FIG. 3, the microcontroller 6 preferably includes a CPU 61, a memory unit 62, an input interface 63, an output interface 64, and a fundamental frequency transmitter 65.

The CPU 61 is an arithmetic processing unit which performs arithmetic processing based on various signals inputted from the input interface 63 and PWM profiles (to be later described) stored in the memory unit 62. The CPU 61 functions as the switching control unit 81 and the motor drive control unit 82. That is, the switching control unit 81 and the motor drive control unit 82 are included in one microcontroller 6.

A plurality of predetermined PWM profiles 621 are stored in the memory unit 62. The PWM profile 621 is data showing a time-dependent change of a duty ratio of the switching control signal S81 that is a PWM signal.

FIG. 6 is a view showing an example of the PWM profile 621. In FIG. 6, a cycle of the first AC voltage S11 and the second AC voltage S2 is indicated by T [ms]. As shown in FIG. 6, the PWM profile 621 represents a time-dependent change of the PWM duty for ½ cycle. The PWM profile 621 in FIG. 6 includes, as a portion thereof, a period in which the duty ratio is 100%. Thus, by providing a period in which the switching element 42 does not perform the switching operation, it is possible to improve a power factor more appropriately according to the operating status of the motor 9.

Further, the PWM profile 621 may include, as a portion thereof, a period in which the duty ratio is 0%. Even in this case, a period in which the switching element 42 does not perform the switching operation is provided.

The input interface 63 delivers each signal inputted from the outside to the CPU 61. The output interface 64 delivers an output signal which is arithmetically processed by the CPU 61 to the outside. The fundamental frequency transmitter 65 generates a clock signal S65 which becomes the fundamental frequency of the switching control signal S81 and a motor drive signal S82.

The switching control unit 81 selects one PWM profile 621 from the plurality of PWM profiles 621, based on the zero-cross detection signal S5 delivered from the input interface 63, and a voltage feedback signal S71 and a current feedback signal S72 to be described later.

The switching control unit 81 outputs the switching control signal S81 through the output interface 64 based on the zero-cross detection signal S5, the selected PWM profile 621 and the clock signal S65. The switching control signal S81 is a PWM signal to control ON/OFF of the switching element 42.

The switching control unit 81 starts the generation of the switching control signal S81 according to the selected PWM profile 621 at a timing at which the zero-cross detection signal S5 is switched to the voltage value L from the voltage value H, or a timing at which the zero-cross detection signal S5 is switched to the voltage value H from the voltage value L.

The switching control signal S81 has a cycle of an integer multiple of the cycle of the clock signal S65. The switching control unit 81 generates the switching control signal S81 in accordance with the timing of the clock signal S65 according to the duty ratio obtained by referring to the PWM profile 621.

The switching control signal S81 outputted from the switching control unit 81 is inputted to the switching element 42 after a range of the voltage value thereof is adjusted through a first level shift circuit 66.

In the present embodiment, the switching control unit 81 determines one PWM profile 621 based on both the voltage feedback signal S71 and the current feedback signal S72, but the present invention is not limited thereto. The switching control unit 81 may determine one PWM profile 621 according to either the voltage feedback signal S71 or the current feedback signal S72.

Thus, in the present embodiment, a constant voltage power supply 10 includes the AC/DC converter circuit 3, the switching regulator 4, the zero-cross detector 5 and the switching control unit 81. The constant voltage power supply 10 converts an AC voltage, supplied from the AC voltage source 11 via the filter circuit 2, into the second DC voltage S4 and supplies the second DC voltage S4 to the inverter 12.

The switching control unit 81 controls the flow of the current in the constant voltage power supply 10 by controlling the switching element 42. The switching control unit 81 can approximate the waveform of the input current inputted to the constant voltage power supply 10 to the waveform of the input voltage inputted to the constant voltage power supply 10. Therefore, the switching control unit 81 controls the switching element 42, so that it is possible to improve the power factor of the constant voltage power supply 10 without using a transformer which is a large component. Further, since the power factor of the constant voltage power supply 10 can be improved without using a transformer, there is no heat loss due to the transformer. Therefore, it is possible to suppress a decrease in efficiency of the constant voltage power supply 10 while improving the power factor.

The motor drive control unit 82 outputs the motor drive signal S82 based on a rotation command signal S0 inputted from the outside, the voltage feedback signal S71 to be later described, the current feedback signal S72 to be later described and the position information detection signal S91. The motor drive signal S82 includes six PWM signals to control ON/OFF of six switching elements included in the inverter 12. The motor drive signal S82 outputted from the motor drive control unit 82 is inputted to the inverter 12 after a range of the voltage value thereof is adjusted through a second level shift circuit 67.

The switching control unit 81 and the motor drive control unit 82 generate the switching control signal S81 and the motor drive signal S82, respectively, based on the common clock signal S65. In the present embodiment, as the switching control signal S81, a PWM signal with a frequency of 10 to 30 kHz suitable for driving a motor is used. Thus, in order to generate the switching control signal S81 having a frequency higher than that for driving the motor, it is unnecessary to provide a frequency transmitter for generating a clock signal having a higher frequency separately from the fundamental frequency transmitter 65 for driving the motor. Therefore, without preparing a separate microcontroller from the microcontroller for generating the motor drive signal S82 in order to generate the switching control signal S81, it is possible to realize the switching control unit 81 and the motor drive control unit 82 by one microcontroller 6.

Further, as described above, the switching regulator 4 of the present embodiment is a switching regulator of a so-called step-down chopper type. Therefore, the switching regulator 4 operates more efficiently in the case where the switching control signal S81 inputted to the switching element 42 is a PWM signal with a frequency of 10 to 30 kHz suitable for driving the motor.

The feedback unit 7 preferably includes a voltage feedback unit 71 and a current feedback unit 72.

The voltage feedback unit 71 detects the voltage value of the second DC voltage S4, and inputs the detected voltage value to the microcontroller. As shown in FIGS. 1 and 2, the voltage feedback unit 71 includes a voltage input terminal 711, a voltage dividing circuit 714 having two resistors 712 and 713, and a voltage output terminal 715.

The voltage input terminal 711 is connected to the output terminal 47 of the switching regulator 4. Therefore, the second DC voltage S4 is inputted to the voltage input terminal 711. One end of the resistor 712 is connected to the voltage input terminal 711, and the other end of the resistor 712 is connected to the resistor 713. One end of the resistor 713 is connected to the resistor 712, and the other end of the resistor 713 is grounded. The voltage output terminal 715 is connected to a connection portion of the resistor 712 and the resistor 713. The voltage output terminal 715 is connected to the input interface 63 of the microcontroller 6. Thus, the voltage feedback signal S71 obtained by dividing the second DC voltage S4 according to a ratio of the resistance values of the resistors 712 and 713 is outputted to the CPU 61 of the microcontroller 6 from the voltage output terminal 715.

The current feedback unit 72 detects a value of the current flowing through the inverter 12, and inputs the detected current value to the microcontroller 6. As shown in FIG. 2, the current feedback unit 72 includes a shunt resistor 721 and an amplifier circuit 722.

One end of the shunt resistor 721 is connected to the inverter 12, and the other end of the shunt resistor 721 is connected to ground. When a current flows in the inverter 12, a current flows through the shunt resistor 721. Further, the input terminal of the amplifier circuit 722 is connected to the one end of the shunt resistor 721. Thus, a shunt voltage S721 having a voltage value corresponding to the value of the current flowing through the inverter 12 is inputted to the amplifier circuit 722. The amplifier circuit 722 amplifies the inputted shunt voltage S721, and outputs, to the microcontroller 6, the current feedback signal S72 having a voltage value corresponding to the value of the current flowing through the inverter 12.

The inverter 12 supplies a drive current S12 to the motor 9 based on the motor drive signal S82 inputted from the motor drive control unit 82. The inverter 12 includes six switching elements. A pair of motor drive signals S82 is inputted to the inverter 12 for each of U, V and W phases of the motor 9. The inverter 12 switches the driving timing of each switching element, and generates the drive current S12. Thus, the rotation of the motor 9 is controlled.

2. Modification Example

The exemplary embodiment of the present invention has been described, but the present invention is not limited to the embodiment described above.

Figure 7:
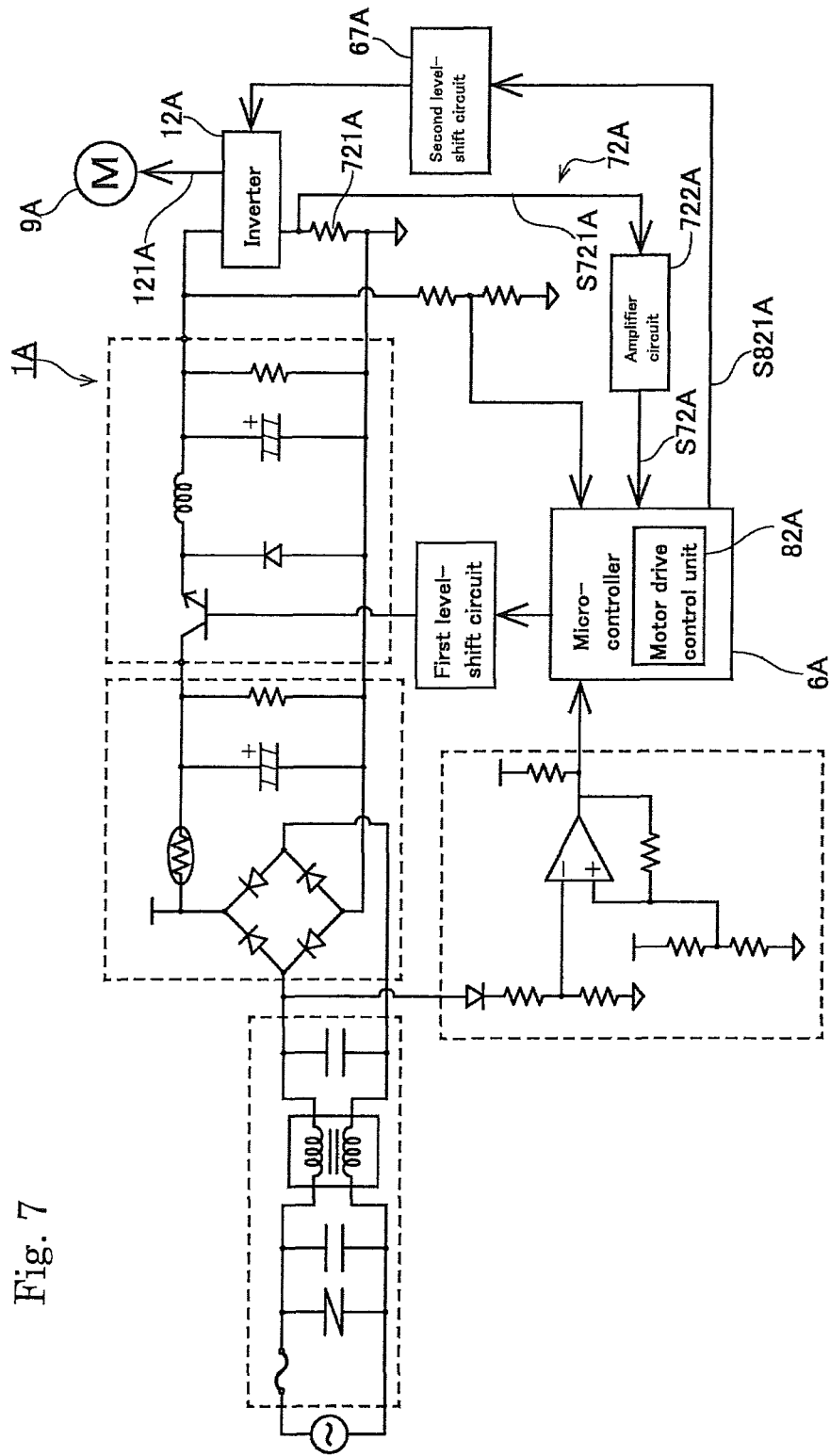
FIG. 7 is a circuit diagram showing a configuration of a motor drive device in accordance with a modification example.

FIG. 7 is a circuit diagram showing a configuration of a motor drive device 1A according to a modification. The motor drive device 1A is a device for controlling the driving of a motor 9A that is a sensorless motor.

A microcontroller 6A serving as a motor drive control unit 82A outputs a position detection pulse signal S821A, instead of a motor drive signal for driving the motor 9A, to an inverter 12A through a second level shift circuit 67A in order to estimate the position of the rotor of the motor 9A. When the inverter 12A supplies a position detection current S121A to the motor 9A in response to the position detection pulse signal S821A, an electromotive force is generated in the motor 9A, and a current flows through a shunt resistor 721A. Accordingly, a shunt voltage S721A having a voltage value corresponding to the value of the current flowing in the inverter 12A is inputted to an amplifier circuit 722A. The amplifier circuit 722A amplifies the inputted shunt voltage S721A, and outputs, to the microcontroller 6A, a current feedback signal S72A having a voltage value corresponding to the value of the current flowing through the inverter 12A.

The motor drive control unit 82A estimates the position of the rotor of the motor 9A based on the current feedback signal S72A and the position detection pulse signal S821A outputted to the inverter 12A. Thus, the motor 9A may be a sensorless motor, in which case the motor drive control unit 82A has no position detector.

In the above embodiment, the switching control unit selects one PWM profile from a plurality of PWM profiles in accordance with at least one of the voltage feedback signal and the current feedback signal, but the present invention is not limited thereto. The switching control unit may determine the PWM profile based on a predetermined calculation formula and at least one of the voltage feedback signal and the current feedback signal. Further, the switching control unit may correct the duty ratio of predetermined one PWM profile, for example, by multiplying a coefficient by a predetermined computation based on at least one of the voltage feedback signal and the current feedback signal. In addition, the switching control unit may use predetermined one PWM profile without depending on any of the voltage feedback signal and the current feedback signal.

In the above embodiment, in the zero-cross detector, the second AC voltage is half-wave rectified and then inputted to the comparator as a comparison target voltage, but the present invention is not limited thereto. The comparison target voltage may be, for example, the second AC voltage itself, or may be other voltage signals as long as the timing of the second AC voltage can be accurately identified.

In the above embodiment, in the zero-cross detector, the comparison target voltage is inputted to the inverting input terminal of the comparator, and the reference voltage is inputted to the non-inverting input terminal of the comparator, but they may be reversed. In this case, the voltage values H and L of the zero-cross detection signal are switched. Even in this case, the timing that can be detected is the same as the above embodiment.

Further, a specific circuit configuration for implementing each part of the motor drive device may be different from the circuit configuration shown in FIG. 2. Further, to the extent that no conflict arises, the elements that appear in the embodiment and the modification example described above may be combined appropriately.

At least an embodiment of the present invention is applicable to a device for driving a motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor drive device comprising:
a constant voltage power supply structured to supply a DC voltage to an inverter to drive a motor; and
a motor drive control unit,
wherein the constant voltage power supply comprises:
an AC/DC converter structured to convert an AC voltage supplied from an AC voltage source into a DC voltage, and output a first DC voltage, the AC/DC converter having a rectifier circuit to rectify the AC voltage, and a first smoothing capacitor;
a zero-cross detector structured to detect a zero-cross point of the AC voltage, and output a zero-cross detection signal;
a switching control unit structured to output a switching control signal that is a PWM signal at a timing based on the zero-cross detection signal; and
a switching regulator structured to receive the first DC voltage, and output, to the inverter, a second DC voltage generated by performing switching on the first DC voltage, the switching regulator having a switching element to perform the switching in accordance with the switching control signal, and
the motor drive control unit outputs a motor drive signal to the inverter based on an inputted rotation command signal;
wherein the switching control unit and the motor drive control unit are included in one microcontroller, and the switching control unit and the motor drive control unit respectively generate the switching control signal and the motor drive signal, based on a common clock signal.

2. The motor drive device of claim 1, wherein the switching regulator comprises:
an input terminal structured to receive the first DC voltage;
an output terminal structured to output the second DC voltage;
the switching element, one side of which is connected to the input terminal;
an inductor connected between the output terminal and the other side of the switching element;
a diode connected between the ground and a connection portion between the inductor and the switching element; and
a second smoothing capacitor connected between the ground and the output terminal.

3. The motor drive device of claim 1, wherein the switching control unit determines a PWM profile indicating a time-dependent change of a duty ratio of the PWM signal, and outputs the switching control signal based on the PWM profile.

4. The motor drive device of claim 3, further comprising:
a voltage feedback unit structured to detect a voltage value of the second DC voltage, and input the detected voltage value to the switching control unit; and
a current feedback unit structured to detect a value of a current flowing through the inverter, and input the detected current value to the switching control unit,
wherein the switching control unit determines the PWM profile in accordance with at least one of the voltage value and the current value.

5. The motor drive device of claim 4, wherein the PWM profile is selected by the switching control unit from a plurality of predetermined PWM profiles in accordance with at least one of the voltage value and the current value.

6. The motor drive device of claim 4, wherein the switching control unit determines the PWM profile based on a predetermined calculation formula and at least one of the voltage value and the current value.

7. The motor drive device of claim 3, wherein the PWM profile includes, in part, a period in which a duty ratio is 0% or 100%.

8. The motor drive device of claim 1, wherein the zero-crossing detector comprises:
a comparator structured to compare a voltage value of a comparison target voltage with a voltage value of a reference voltage; and
a half-wave rectifier circuit structured to half-wave rectify and output the second AC voltage,
wherein the comparator uses an output of the half-wave rectifier circuit as the comparison target voltage, and the reference voltage is a positive DC voltage.

9. A motor drive device comprising:
a constant voltage power supply structured to supply a DC voltage to an inverter to drive a motor; and
a motor drive control unit,
wherein the constant voltage power supply comprises:
an AC/DC converter structured to convert an AC voltage supplied from an AC voltage source into a DC voltage, and output a first DC voltage, the AC/DC converter having a rectifier circuit to rectify the AC voltage, and a first smoothing capacitor;

a zero-cross detector structured to detect a zero-cross point of the AC voltage, and output a zero-cross detection signal;

a switching control unit structured to output a switching control signal that is a PWM signal at a timing based on the zero-cross detection signal; and a switching regulator structured to receive the first DC voltage, and output, to the inverter, a second DC voltage generated by performing switching on the first DC voltage, the switching regulator having a switching element to perform the switching in accordance with the switching control signal, and the motor drive control unit outputs a motor drive signal to the inverter based on an inputted rotation command signal;

wherein the switching control unit determines a PWM profile indicating a time-dependent change of a duty ratio of the PWM signal, and outputs the switching control signal based on the PWM profile;

wherein the motor drive device further comprises:

a voltage feedback unit structured to detect a voltage value of the second DC voltage, and input the detected voltage value to the switching control unit; and a current feedback unit structured to detect a value of a current flowing through the inverter, and input the detected current value to the switching control unit;

wherein the switching control unit determines the PWM profile in accordance with at least one of the voltage value and the current value.

10. The motor drive device of claim 9, wherein the switching regulator comprises:

an input terminal structured to receive the first DC voltage;

an output terminal structured to output the second DC voltage;

the switching element, one side of which is connected to the input terminal;

an inductor connected between the output terminal and the other side of the switching element;

a diode connected between the ground and a connection portion between the inductor and the switching element; and a second smoothing capacitor connected between the ground and the output terminal.

11. The motor drive device of claim 9, wherein the PWM profile is selected by the switching control unit from a plurality of predetermined PWM profiles in accordance with at least one of the voltage value and the current value.

12. The motor drive device of claim 11, wherein the switching control unit determines the PWM profile based on a predetermined calculation formula and at least one of the voltage value and the current value.

13. The motor drive device of claim 9, wherein the PWM profile includes, in part, a period in which a duty ratio is 0% or 100%.

14. The motor drive device of claim 9, wherein the zero-crossing detector comprises:

a comparator structured to compare a voltage value of a comparison target voltage with a voltage value of a reference voltage; and a half-wave rectifier circuit structured to half-wave rectify and output the second AC voltage, wherein the comparator uses an output of the half-wave rectifier circuit as the comparison target voltage, and the reference voltage is a positive DC voltage.

15. The motor drive device of claim 14, wherein the PWM profile is selected by the switching control unit from a plurality of predetermined PWM profiles in accordance with at least one of the voltage value and the current value.

16. The motor drive device of claim 15, wherein the switching control unit determines the PWM profile based on a predetermined calculation formula and at least one of the voltage value and the current value.

17. A motor drive device comprising:

a constant voltage power supply structured to supply a DC voltage to an inverter to drive a motor; and a motor drive control unit, wherein the constant voltage power supply comprises:

an AC/DC converter structured to convert an AC voltage supplied from an AC voltage source into a DC voltage, and output a first DC voltage, the AC/DC converter having a rectifier circuit to rectify the AC voltage, and a first smoothing capacitor;

a zero-cross detector structured to detect a zero-cross point of the AC voltage, and output a zero-cross detection signal;

a switching control unit structured to output a switching control signal that is a PWM signal at a timing based on the zero-cross detection signal; and a switching regulator structured to receive the first DC voltage, and output, to the inverter, a second DC voltage generated by performing switching on the first DC voltage, the switching regulator having a switching element to perform the switching in accordance with the switching control signal, and the motor drive control unit outputs a motor drive signal to the inverter based on an inputted rotation command signal;

wherein the zero-crossing detector comprises:

a comparator structured to compare a voltage value of a comparison target voltage with a voltage value of a reference voltage; and a half-wave rectifier circuit structured to half-wave rectify and output the second AC voltage, wherein the comparator uses an output of the half-wave rectifier circuit as the comparison target voltage, and the reference voltage is a positive DC voltage.

18. The motor drive device of claim 17, wherein the switching regulator comprises:

an input terminal structured to receive the first DC voltage;

an output terminal structured to output the second DC voltage;

the switching element, one side of which is connected to the input terminal;

an inductor connected between the output terminal and the other side of the switching element;

a diode connected between the ground and a connection portion between the inductor and the switching element; and a second smoothing capacitor connected between the ground and the output terminal.

19. The motor drive device of claim 17, wherein the switching control unit determines a PWM profile indicating a time-dependent change of a duty ratio of the PWM signal, and outputs the switching control signal based on the PWM profile.

20. The motor drive device of claim 19, wherein the PWM profile includes, in part, a period in which a duty ratio is 0% or 100%.

* * * * *